Patented Aug. 23, 1938

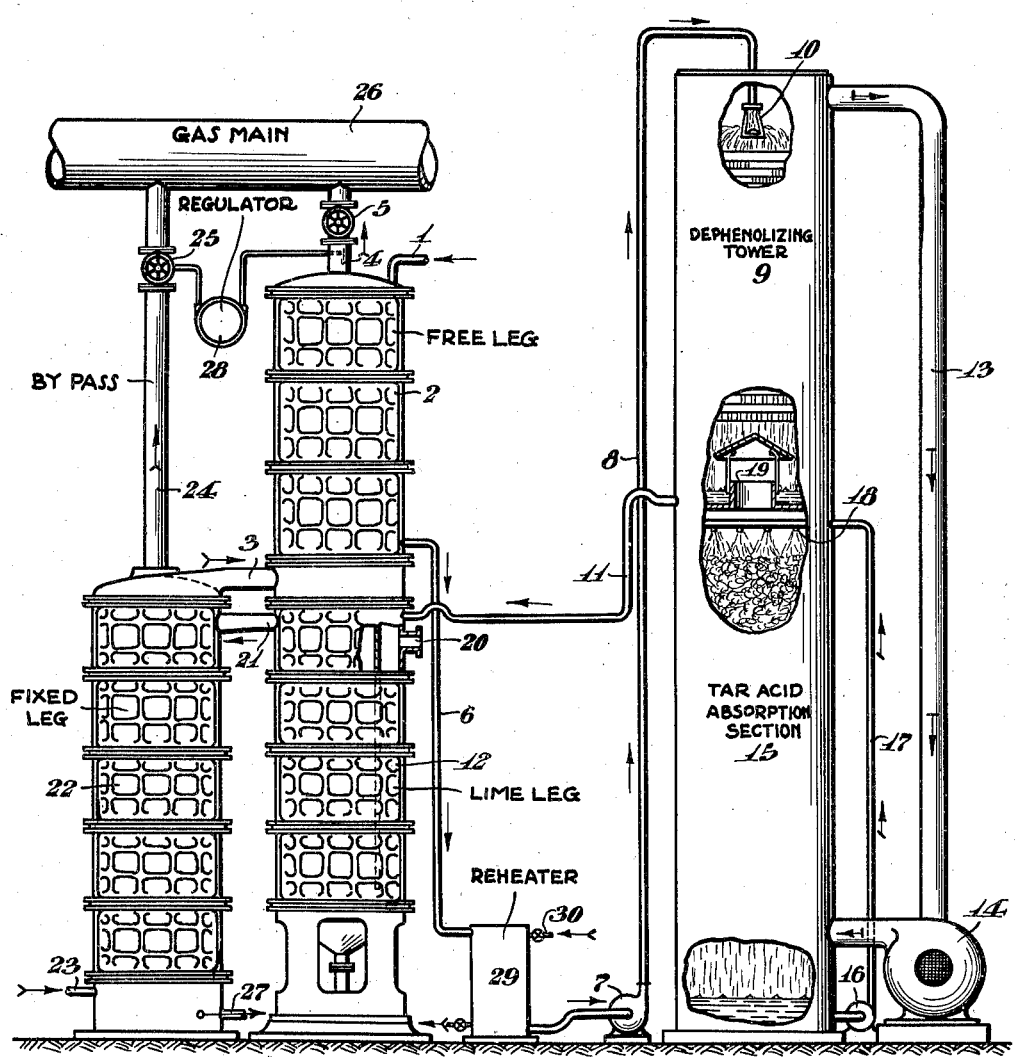

2,127,503

UNITED STATES PATENT OFFICE 2,127,503

GAS LIQUOR TREATMENT

Fred Denig, Pittsburgh, Pa., assignor, by mesne assignments, to Koppers Company, a corporation of Delaware Application February 7, 1935, Serial No. 5,446

5 Claims. (Cl. 260—627)

My invention relates to an improved method of treating liquors containing tar acids, whereby substantially complete removal and recovery of these materials can be effected, thereby giving not only an increased economic advantage to the process but the solution of an acute industrial problem as well.

With the invention and reduction to practice of the Process of dephenolization of such liquors, as described in U. S. Patent 1,920,604 to Sperr and Shaw and U. S. Patent 1,957,295 to Shaw, a substantial step forward toward solution of this industrial and municipal problem was made. This invention offered a means whereby substantially complete removal of tar acids from gas liquors such as are produced in the carbonization of coals, could be effected.

Briefly stated, such invention and process comprise the following steps. The gas liquor or solution bearing tar acids, ammonia, and other volatile constituents was distilled in the manner of the then known art. The free ammonia was removed in the so-called free ammonia section of the still by bringing it in intimate contact with a counter-current flow of steam, the free ammonia being volatilized in the gaseous stream. The hot liquor from the bottom of the free ammonia section was then exposed in a suitable scrubbing tower to an ascending current of hot recirculating inert gases which removed the tar acids from the liquors in vapor form as the liquor descended through the tower. The recirculating gases were subsequently scrubbed with an alkaline solution, preferably sodium hydroxide, to effect the removal of the vaporized tar acids before the recirculating gases were again brought into contact with new quantities of the hot liquor. The gas liquor then substantially dephenolized, was returned to the lime section of the ammonia still where the fixed ammonia was freed from its various combinations by admixture with milk of lime; the ammonia thus liberated was then removed by distillation with steam in the fixed ammonia section of the still and the effluent still waste substantially freed of both ammonia and tar acid was discharged into the public waterways and streams without creating a nuisance or noxious situation.

For reasons of economy and operating expediency, the lime or preferred alkali used to liberate the fixed ammonia from its salts is not added to the gas liquor prior to its free ammonia distillation. Significant amounts of $H_2S$, $CO_2$, HCN, etc. are present in the raw liquor and were the lime added to the liquor before its introduction into the still, these acidic gases would combine with the lime to form insoluble compounds which would not only render the combined lime ineffective for further use in the process, but by deposition of the insolubles on the still trays, give rise to operating disturbances.

A primary function of the free ammonia section of the still is therefore the removal of the acidic gases from the gas liquor. These gases are combined with the ammonia in the raw liquor in the form of salts which are volatile at the temperatures existing in the free ammonia section. Their substantially complete removal in this section of the still, for the aforementioned reasons, is more important in the process than the complete removal of all the uncombined ammonia, since the ammonia of this nature that would reach the lime leg of the still would be removed by the subsequent treatment in the fixed ammonia section. The free section of the still might well be called a dissociator.

Furthermore, the substantially complete removal of the acidic gases in the free section of the still is important where the gas liquor is dephenolized by the Koppers methods of dephenolization of said Shaw patents, since these gases, if introduced into the dephenolizer, combine with the alkali found therein to form compounds that are ineffective for phenol absorption. The acidic gases are preferably reduced to a volume of not more than 2 cc. per 100 cc. of gas liquor before the residual liquor from the free section is introduced into the dephenolizer.

The total quantity of steam used in the course of the distillation was that which empirical results had demonstrated was necessary for the complete stripping of the ammonia from the gas liquor. This quantity was usually sufficient not only to remove substantially all ammonia from the gas liquor treated, but was in excess of that quantity required to reduce the acidic gases in the residual liquor of the free section of the still to the above defined limits. The bringing into contact of the total quantity of steam required in the distillation process and the total quantity of gas liquor treated was, therefore, effected without due regard for the influence such practice had on the efficiency of the tar acid recovery step. The main objective was the substantially complete removal of the ammonia and tar acids from the gas liquor so as to circumvent any objection to the discharge of the still waste into sewage or stream channels.

This practice has resulted in the loss from 25 to 35 percent of the available tar acids in the gas liquor and constitutes not only a real economic loss but creates anew the problem of its recovery and disposal since the loss comprises that quantity of tar acids which is vaporized from the free ammonia still by passage through it of an excessive quantity of steam, which reintroduces the tar acids into the coal gas stream, in which they usually are carried on through the saturator and into the final cooler, into the benzol and purification plants where, they collect in the waste waters from these units, giving rise to another disposal problem.

The total ammonia and total tar acid contents of gas liquors vary widely not only in their concentration but also in the chemical nature of the compounds which fall into these two classes; and such variations are peculiar to any given plant and combination of operating conditions. Gas liquors presenting identical analyses for total ammonia, and tar acids may require substantially different conditions of treatment in order to effect their removal and recovery, in such manner as to achieve optimum economic results and material yields.

For example, two gas liquors may carry the same total ammonia content, and the one may contain low free ammonia while the other may be relatively high. The former will require the passage of a smaller quantity of steam through the free ammonia section at a given temperature for its substantial removal than the latter and any steam in excess of that amount not only is unnecessary but tends also to volatilize simultaneously some of the valuable tar acids which will be lost to the tar acid recovery unit which treats the gas liquor after it has passed through the free ammonia section. A gas liquor containing a high percentage of the total ammonia in the form of fixed salts will require a more vigorous treatment with steam in the fixed ammonia section than if the converse were true, and if this larger volume of steam is passed on to the free ammonia section "in toto", it may be much in excess of that actually required to volatilize substantially all of the acidic gases, in seeking to volatilize substantially all the free ammonia, in which case the danger again exists of simultaneously removing some substantial amounts of the valuable tar acids which will be lost to the recovery process.

It is thus a desirable feature of the present invention that any still designed for this purpose shall have incorporated within it certain features and innovations, which will make possible greater flexibility of operation and control than has existed in the prior art, and also permit of easier adaptability to any fluctuating composition of the raw material.

My invention therefore has for its object such operation and modification of the existing still structure that the aforementioned desirable results may be easily achieved with a high degree of efficiency.

The invention has for further objects such other improvements and such other operative advantages or results as may be found to obtain in the processes or apparatus hereinafter described or claimed.

In order that my invention may be clearly set forth and understood, I now describe, with reference to the accompanying drawing, forming a part of this specification and showing for purposes of exemplification a preferred apparatus and method in which the invention may be embodied and practiced but without limiting the claimed invention specifically to such illustrative instance or instances, wherein, The single figure is a view, partly in elevation and partly in vertical section, of apparatus suitable for the application of my present invention.

The untreated gas liquor is admitted to the free ammonia section 2, consisting of a series of trays equipped with bubble-caps, by means of pipe 1. In the free ammonia section the gas liquor comes into intimate contact with a counter-current flow of steam which enters the section through connection 3. The vaporized ammonia and acidic gases such as $CO_2$, HCN, and $H_2S$ ascend through the still column 2 and leave through pipe 4 at such rate as is determined by adjustment of valve 5. The gas liquor now stripped of only part of or all of its free ammonia flows from still section 2 through pipe 6 to pump 7 by means of which it is forced to the top section of the dephenolizing tower 9 through pipe 8, and is distributed over the wooden hurdles by spray 10. During its passage downward over the hurdles the hot liquor is contacted with a counter-current flow of hot inert vapor or gases which removes the tar acids from the liquor before the liquor collects in the bottom of section 9 and flows through pipe 11 to the lime leg 12 of the ammonia still. The hot gases from the dephenolizing section 9 pass into pipe 13 and are forced into the tar acid absorption tower 15 by means of blower 14 where any tar acids carried by the hot gases are absorbed by an alkaline solution, preferably sodium hydroxide, that is recirculated in the tar acid absorption section 15 by means of pump 16 through pipe 17 and sprays 18. The hot gases now freed of their tar acid content pass again into section 9 through pipe 19 ready to vaporize more tar acids from fresh quantities of hot gas liquor introduced at spray 10.

In the lime leg the dephenolized gas liquor is mixed with milk of lime or any alkaline material which is brought into this section through pipe 20. The lime or alkali liberates the fixed ammonia and the mixed liquors flow from 12 through pipe 21 into the fixed-ammonia still-section 22. In this still-section the liquid mixture is subjected to further distillation by means of steam, which enters the still at pipe 23, for removal of the previously fixed ammonia, and the vapors evolved pass from the fixed ammonia still-section 22 proportioned as preferred through pipe 24 and valve 25 to the gas main 26 and through pipe connection 3 into the free ammonia section 2 through pipe 4 and valve 5 to the gas main 26. Valve 25 is regulated to by-pass a portion of the total steam around the free section 2, so that there is delivered through pipe 3 into the free section 2 only an amount of steam sufficient to remove substantially all of the acidic gases such as $CO_2$, $H_2S$, and HCN, but insufficient to remove significant amounts of the tar acids contained in the liquor transversing the free section 2, irrespectively of whether the free ammonia is all driven off from or to some extent remains in the liquor leaving the free section 2 of the still, since any free ammonia remaining will eventually reach the fixed-ammonia still-leg 22, which then functions as secondary free ammonia distillation section to drive off residual free ammonia, which will be passed through either or both conduits 24 and free section 2 and through line 26 to be eventually recovered. In this manner all, or nearly all, the acidic gases are removed in the free section 2, but all or nearly all the tar acids remain in the liquor passing to the dephenolizing step, nor more than about 2% being lost to the gas line 26. For example, in instances where the "total" steam is all introduced in the lime or fixed leg, the amount of this steam that is by-passed through line 24 to obtain the novel advantages of the present invention has been found to be from 13% to 15% of the "total" steam. The efficiency of tar acid retention in the free section during the distillation depends not only upon the temperatures used but also upon the quantities of steam passed through the liquor while being held at the operating temperature. For example, it is conceivable that at a given temperature in the free section with no steam passing through it, practically no tar acids would be removed from the gas liquor treated, while at a lower temperature with large quantities of steam passing through the free section a very substantial removal of tar acids from the gas liquor might result. The treatment in the free section therefore depends not only upon the temperatures maintained but also upon the so-called sweeping action of the steam. I pass only sufficient steam through the free section to cause the removal of the acidic gases and will not remove the higher boiling tar acids at the temperature of operation. A definite amount of steam is required to properly strip the total ammonia from the gas liquor; that amount is sufficient to remove a significant percentage of the tar acids from the gas liquor if it is passed through the gas liquor "in toto", and consequently, in order to retain the tar acids in the gas liquor, a certain percentage of the total steam is by-passed around the free section. Utilizing this principle the required percentages for gas liquors of different compositions are readily determinable empirically.

The distilled liquor or still waste is discharged from the bottom of the fixed still 22 through pipe 27 substantially free of noxious impurities and may be disposed of as desired.

The residual liquor from the free section of the still may be heated indirectly, if necessary, by steam introduced at 30 into the preheater 29, before the residual liquor is introduced into the dephenolizing tower 9 by pump 7 through spray 10 in order to maintain the liquor at 100 to 102° C.

As will be appreciated by those experienced in the art, the introduction and incorporation into the still design of individual vapor vents for the free and fixed ammonia sections of the still together with a connection for passing vapors from the fixed section to the free section, offer decided operative advantages over prior practice. My invention permits easy and rapid proportioning of the steam passing through the two still sections; and by simple adjustments, the processing requirements of individual gas liquors of a wide range of characteristics may be readily accommodated.

In illustration of one of the advantages that arises from the use of this invention, I will cite the instance where an ammonia still, in normal operation on gas liquor produced by the carbonization of coal and in combination with a Koppers dephenolization plant of the so-called "hot recirculating vapor" type of said Shaw patents, was treating a gas liquor at the rate of 2000 gallons per hour in a still, with approximately 3 lbs. of steam per gallon of liquor. The steam and raw liquor were brought into contact in counter-current fashion, the total quantity of steam used in the distillation being admitted at the base of the fixed ammonia section and after traversing that section passed into the free ammonia section and thence into the gas stream in the manner usual in the art.

The raw gas liquor being treated contained 1.39 g. p. l. of tar acids and a total ammonia content of 7.08 g. p. l., of which 2.79 g. p. l. were free ammonia and 4.29 g. p. l. were fixed ammonia. The content of acidic gases evolved from the liquor amounted to 85 cc. per 100 cc. of liquor as determined by empirical tests.

During its transit through the free ammonia section of the still, the raw gas liquor was raised from 63° to 102° C. The vapor temperature at the outlet of the free ammonia section of the still was 102° C. The free ammonia content of the gas liquor was reduced to 1.16 g. p. l., the acidic gases to 1.8 cc. per 100 cc. of residual liquor discharged from the free section, and the tar acid content to 0.9 g. p. l. These analytical results are figures corrected for the dilution suffered by the gas liquor through condensation of a portion of the steam used for the distillation in the free ammonia section. Examination of these results shows that the action of the steam in the free ammonia section of the still has been to reduce the content of acidic gases remaining in the liquor to the amounts preferred, prior to its introduction into the dephenolization step, but that in so doing approximately 35.3% of the tar acid content has been removed simultaneously with the result that only about 58% of the tar acids originally present in the gas liquor were actually recovered. The total ammonia in the still waste was reduced to 0.57 g. p. l. during the operation.

Accompanying the installation of a vapor outlet from the fixed ammonia section of the still directly to the gas stream, as well as the addition of three trays to the free ammonia section of this same still, and while operating with substantially the same through-put per hour of raw gas liquor of substantially the same analysis and using the same quantities of steam per gallon of liquor as aforementioned, with the exception that approximately 15% of the total amount of steam introduced into the still at the bottom of the fixed ammonia section, was by-passed around the free ammonia section directly into the gas stream, but maintaining a temperature of 101° C. in the vapors leaving the free ammonia section, the loss in tar acids from the liquor in the free ammonia section amounted to only 2.3% of that quantity originally present in the raw gas liquor; the content of free ammonia was reduced from 3.0 g. p. l. to 0.72 g. p. l. and the content of evolved acidic gases from a volume of 123 cc. per 100 cc. of gas liquor to 1.5 cc. A recovery of approximately 94% of the tar acids present in the original raw gas liquor was obtained in the dephenolizing process and the total ammonia in the still waste amounted to 0.37 g. p. l.

As a second instance, I will cite the case where an ammonia still operating to recover ammonia and tar acids from a gas liquor containing 3.08 g. p. l. of tar acids in the raw liquor lost 27.9% of these tar acids in the free ammonia section during the vaporization of the free ammonia and acidic gases. Following the installation of a vapor by-pass atop the fixed ammonia section as illustrated by pipe 24 and valve 25 in the accompanying drawing, and with the more accurate control of the quantities of steam required in the individual section of the free still in accordance with the present invention; and equally efficient removal of both the free and fixed ammonia was made possible, and the tar acid loss was reduced to only 2% of that contained in the raw liquor, accompanied by a satisfactory removal of the acidic gases in the free ammonia section. The substantially complete removal of the acidic gases in the free section is an important step in the removal of the total ammonia from the gas liquor, since if this is not accomplished, an excessive consumption of lime and deposition of carbonate scale takes place in the fixed leg as well as increased alkali consumption in the tar acid absorption tower 15.

The operation of my invention in combination with the Koppers processes of dephenolization of said Shaw patents, in the manner shown in the accompanying drawing, will permit of the recovery of significantly higher percentages of the tar acids present in the raw gas liquor, accompanied as well by a corresponding technical and financial advantage.

In no wise do I limit the use of my principle to such single illustrative instance as hereinabove described, but cite another example of the many possible alternatives, the case wherein all the steam which is added to the bottom of the fixed still section may be vented from the top of the same directly to the gas main and the relative proportion of steam required for the vaporization of $H_2S$, $CO_2$, and HCN, and at least part of the free ammonia, in the free section, without removal of a significant percentage of tar acids, may be introduced from an independent line; such arrangement will permit the two sections to operate independently as far as the steam circulation and requirements are concerned.

I have also found that if more intimate contact between the gas liquor and the steam in the free ammonia section of the still is established by increasing the number of trays in this column above that normally used in the prior art, such additional trays are a desirable supplement to the efficacy of my invention and of some assistance in the substantially complete retention of all tar acid vapors in the gas liquor during its processing in this section; and is of particular importance where a gas liquor of high free ammonia content is treated. Therefore in my preferred construction, in addition to individual vapor outlets to the gas stream for each still section, I propose to use a number of trays or rings in the free ammonia section in excess of that now normally used in the art.

My invention also lends itself simply to automatic control. Any device which will take advantage of the preferred operating temperatures existing in the individual outlets to the free and fixed ammonia sections, or the temperature or vapor velocity differences existing under desired operating conditions to actuate a mechanism or device in such manner as to maintain those conditions can be employed for the purpose. Such device may be installed as shown diagrammatically in the accompanying drawing by reference numeral 28.

In those instances where the fixed ammonia is of such little economic value that its recovery is unprofitable, the treatment with lime may be dispensed with and, by the use of my invention sufficient of the total steam required for the volatilization of the free ammonia may be allowed to pass through the free ammonia section of the still to remove substantially all the acidic gases from the raw liquor, with retention of substantially all the tar acids in the residual liquor from that section, while any uncombined ammonia that may still be present in such residual liquor may be volatilized from the fixed section directly into the gas stream through that section's individual vapor vent, after the residual liquor from the free section has been returned to the fixed section from the dephenolizer where the tar acid content has been removed. In such case the fixed leg constitutes a secondary section of free still 2.

The invention is equally applicable to dephenolization by dephenolizing the liquor after leaving the fixed leg rather than the free section, as for example as also described in said Shaw Patent 1,957,295.

The invention as hereinabove set forth is embodied in particular form and manner but may be variously embodied within the scope of the claims hereinafter made.

I claim:

1. A process for the distillation of gas liquor or liquors containing tar acids derived from a stream of gas which comprises heating of the liquors in the free section of an ammonia still to such temperature and passing therethrough such quantities of steam or vapor from a fixed section of the still that substantially complete removal of the acidic gases is obtained; introducing the constituents volatilized from the free section into the gas stream, heating the resulting liquor in the fixed section of the still, restricting the volume of the hot vapors entering the free ammonia section from the fixed section to sufficiently high amounts that the acidic gases are substantially completely removed from the liquor there treated but sufficiently low that substantially all tar acids are retained therein and carried away in the residual liquor from the free section, irrespectively of whether the free ammonia is all driven off from or to some extent remains in the liquor leaving the free section, passing the excess vapors distilling from the fixed section directly into the gas stream, and dephenolizing the gas liquor with recovery of its tar acid subsequently to its treatment as aforesaid in the free ammonia section.

2. A process for the distillation of gas liquor or liquors containing tar acids derived from a stream of gas which comprises heating of the liquors in the free section of an ammonia still to such temperature and passing therethrough such quantities of steam from a fixed section of the still that substantially complete removal of the acidic gases is obtained; introducing the constituents volatilized from the free section into the gas stream, admixing the residual liquor from the free section with alkaline substances reactive with fixed ammonia liberating free ammonia; distilling such mixture in the fixed section for the volatilizaton of the liberated ammonia, restricting the volume of the hot vapors entering the free ammonia section from the fixed section to sufficiently high amounts that the acidic gases are substantially completely removed from the liquor there treated but sufficiently low that substantially all tar acids are retained therein and carried away with the residual liquor from the free section, irrespectively of whether the free ammonia is all driven off from or to some extent remains in the liquor leaving the free section, passing any excess vapors distilling from the fixed section directly into the gas stream, and dephenolizing the gas liquor with recovery of its tar acid subsequently to its treatment as aforesaid in the free ammonia section.

3. In a method of distilling ammoniacal liquor in an ammonia still comprising a free section, a lime leg and a fixed section, which comprises subjecting the liquor to distillation with steam in the free section at temperatures and with quantities of steam sufficient to substantially completely remove all acidic gases but insufficient to remove substantial amounts of tar acids present in the liquor, irrespectively of whether all the free ammonia is driven off from or to some extent remains in the liquor leaving the aforesaid free section; thereafter completing the distillation by treating the liquor, which has passed through the free section, with lime in the lime leg to decompose fixed ammonia compounds in the liquor; and then steam distilling the liquor from the lime leg in the fixed section to distill off from the liquor free ammonia liberated by such decomposition in the lime leg and dephenolizing the gas liquor with recovery of its tar acid subsequently to its treatment as aforesaid in the free section.

4. In a method of distilling ammoniacal liquor in an ammonia still comprising a primary free section and a secondary section, which comprises subjecting the liquor to primary distillation with steam in the primary free section at temperatures and with quantities of steam sufficient to substantially completely remove all acidic gases but insufficient to remove substantial amounts of tar acids present in the liquor, irrespectively of whether all the free ammonia is driven off from or to some extent remains in the liquor leaving the aforesaid free section; thereafter completing the distillation by subjecting the liquor, which has passed through the primary free section, to secondary free ammonia distillation to remove the residual free ammonia remaining over from the primary free ammonia distillation step, and dephenolizing and recovering the tar acids from the gas liquor subsequently to the aforesaid primary distillation thereof.

5. In a method of distilling ammoniacal liquor derived from a stream of gas in an ammonia still comprising a primary free section and a secondary section, which comprises subjecting the liquor to primary distillation with steam in the primary free section at temperatures and with quantities of steam sufficient to substantially completely remove all acidic gases but insufficient to remove substantially amounts of tar acids present in the liquor, irrespectively of whether all the free ammonia is driven off from or to some extent remains in the liquor leaving the aforesaid free section, introducing the constituents volatilized from the primary free section into the gas stream; thereafter completing the distillation by subjecting the liquor, which has passed through the primary free section, to secondary distillation with steam to distill off from the liquor the residual free ammonia remaining over from the primary ammonia distillation; and passing the vapors from the secondary distillation into the primary distillation step, and the excess of those necessary for obtaining the afore-described results in the primary free section directly from the secondary distillation into the gas stream and dephenolizing the gas liquor with recovery of its tar acid subsequently to its treatment as aforesaid in the free section.

FRED DENIG.